April 16, 1935. O. E. OHLUND 1,997,649
WIRE SPLICING MEANS
Filed June 14, 1933
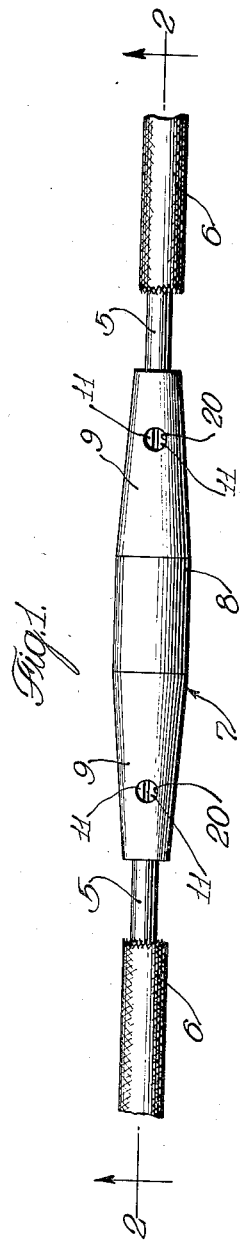
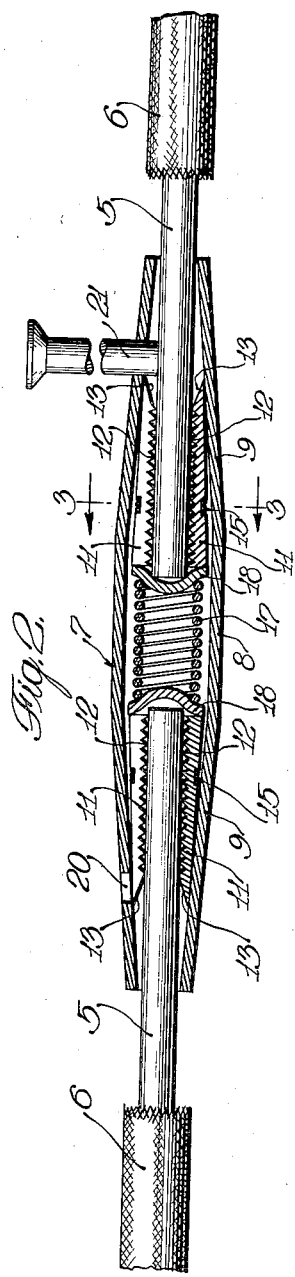
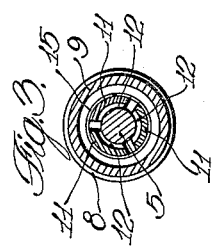
Inventor
O. Edward Ohlund
By Brown, Jackson, Boettcher & Dienner
Att'ys.

Patented Apr. 16, 1935

1,997,649

UNITED STATES PATENT OFFICE 1,997,649

WIRE SPLICING MEANS

Olaf Edward Ohlund, Chicago, Ill.

Application June 14, 1933, Serial No. 675,655

1 Claim. (Cl. 173—303)

This invention relates to wire splicing means, and more particularly to wire splicing means for line wires and the like which may be used and re-used a number of times without impairing the efficiency of the splicing means.

In solderless splices of the type now in use for splicing line wires and the like, comprising generally a pair of chucks or jaw members mounted in opposite ends of a splicing shell, the chucks being adapted to grip and retain the ends of the wires to be spliced, the wires cannot be removed after once being inserted into the shell and being automatically gripped by the jaw members. The common procedure, therefore, is to cut the wire at each end of the splicing shell when it is desired to break the splice, and the splicing device must then be discarded and possesses only junk value.

The jaws of such an automatic gripping splice are spring-pressed outwardly into a tapered portion of the shell, the decrease in diameter of the shell forcing the jaws together to bite into the wire. Any tension on the wire therefore serves only to secure a greater wedging action for preventing release of the wire from the jaws. Pushing the wire into the splice merely increases the spring tension, and when it is then attempted to withdraw the wire, the jaws are immediately forced into wedged and biting engagement with the wire, preventing its release.

In none of the splices of this type of which I am aware is it possible to release the wire from the jaws without destroying the usefulness of the splice, or without the use of very elaborate and delicate tools, which are not practical where a splice is made on an overhead line wire or the like.

In the preferred embodiment of the present invention, therefore, I have disclosed a line wire splice of the automatic gripping solderless type which is provided with means whereby the chucks may be engaged to effect release of the wire therefrom, thus eliminating the necessity of cutting the wire, and also allowing the splice to be used over and over in different installations without injury thereto, and without destroying its mechanical and electrical efficiency. Further, this may be effected without increasing either the size or cost of the device, and no special tool or equipment is necessary for accomplishing the removal of the wire. This produces a very economical splice, saving the cost of the splice after the first installation because of its ability to be re-used in any desired installation.

An object of the present invention, therefore, is to provide an automatic gripping device of this type in which it is possible to hold the jaw members against movement after they have been pushed back against the tension of the spring member, so that the wire may be withdrawn with the jaws held away from their wedged securing position. I accomplish this result by providing means whereby access may be had to the forward edge of the jaw members in order to retain the jaw members against the pressure of the spring when it is desired to release the wire, since the jaw members in this position are not in wedging engagement.

The present invention may also be applied to splices now in use, thus eliminating the necessity of discarding them, and allowing for their continued application for splicing purposes whenever desired.

Other objects and advantages of the invention will appear more fully from the following detailed description, which, taken in connection with the accompanying drawing, will disclose to those skilled in the art the particular construction and operation of a preferred embodiment of my invention.

In the drawing:

Figure 1 is an elevational view of the splice in position;

Figure 2 is a sectional view of the splice taken substantially on the line 2—2 of Figure 1, looking in the direction indicated by the arrows, and showing the manner in which the wire may be released from one of the jaw members; and Figure 3 is a sectional view of the splicing shell and jaw members taken substantially on the line 3—3 of Figure 2.

Referring now in detail to the drawing, in Figures 1 and 2 I have disclosed the line wires or other similar conductors 5 having insulation 6 carried thereby, and adapted to be spliced together within the splicing shell 7. The shell 7 is provided with a central substantially cylindrical section indicated at 8, and with oppositely tapering end portions indicated at 9, which are adapted to contain the chucks or jaw members which automatically grip the wire.

Within the tapered portions 9 of the shell 7 are the jaw members, comprising a plurality of individual jaws 11, of tapered form, which are provided along their inner surface with teeth or serrations 12 which are adapted to bite into the surface of the wire or conductor 5 when it is pushed into position. Preferably, I provide three such jaw members, as shown in Figure 3, to form a wire receiving chuck, which jaw members are provided at their outer ends with beveled lip portions 13 adapted to guide the end of the wire 5 into the central opening formed within the jaw members.

As stated, the jaw members are of tapered section, increasing in thickness as they extend inwardly within the shell 7. Spaced about the periphery of the plurality of jaw members forming the chuck, and seated within a groove formed in the outer surface thereof, is a coiled wire indicated at 15, which is wound around the jaw members and serves to hold them in such position that they move forwardly and backwardly within the shell 7 as a unit. This also forms a fulcrum about which the jaw members may rock when they are slid outwardly within the shell 7, so that the outer surface of the jaw members 11, when coming into contact with the tapered portion 9 of the shell, will be wedged downwardly into biting engagement with the wire 5, and any additional tension placed upon the wire will result in serving to grip the wire more securely within the chuck.

Within the cylindrical portion 8 of the shell 7 I provide a coiled spring member, indicated generally at 17, which is adapted to have bearing engagement at opposite ends against spring follower members 18, which engage the rear ends of the chucks. The spring member at all times urges the jaw members outwardly of the shell 7, and thus, at all times exerts a pressure tending to close the jaw members due to their engagement with the tapered surfaces 9.

In operating the splice, it is customary to push the line wire or conductor 5 into the open end of the tapered portion 9 of the shell, the beveled edges 13 guiding the end of the wire into the opening formed within the jaw member 11. As the wire is pushed in, it forces the jaw members 11 rearwardly a distance sufficient to allow them to open to receive the wire, since in their outermost position the tapered portion of the jaw will not permit them opening to a sufficient distance to permit the entry of the wire therein. They are therefore pushed rearwardly to such position as will allow the wire to slide therethrough to a position shown in the left hand side of Figure 2. The spring 17 is compressed in this position, and tends to force the jaw members outwardly.

However, the tapered surface 9 forces the jaw members down into biting engagement with the wire 5, and as the jaw members reach the position shown in the left hand side of Figure 2, they are forced into biting engagement with the wire, and any further tension upon the wire only serves to increase the wedging action which secures the wire within the splice. This holds the wire in firm engagement within the splice, and it is apparent that ordinarily there is no manner of effecting release of the wire, since any further tension on the wire results in only increasing the securing action between the jaw members 11 and the inner end of the wire 5. Further, because of the spring action, it is not possible to push the wire inwardly of the shell 7 to a position where the jaw members 11 will be loosened, and then attempt to draw the wire outwardly therefrom, since the spring will immediately force the jaw members 11 into firm engagement with the wire.

I have therefore provided means for retaining the jaw members in their inward loosened position against the pressure of the spring 17, so that the wire may be withdrawn without corresponding movement of the jaw members 11 into biting engagement therewith. I accomplish this by providing two small openings indicated at 20 within the shell member, the openings 20 being only of sufficient diameter to admit any suitable tool, such as a stud, nail or the like indicated at 21, within the opening to restrain outward movement of the jaw members 11 comprising the wire gripping chuck. In a splice of this type I have found that a pressure upon the wire inwardly causes the jaw members to ride inwardly along with the wire, due to the biting engagement of the teeth in the surface of the wire, and also due to the wire coil 15, which binds the jaw members together and acts as a fulcrum for forcing the rear ends of the jaw members closed so that the wire cannot be moved inwardly against the spring pressure without also moving the chuck inwardly. It is for this reason that I am able to provide for release of the wire from the splice.

Removal of the wire is therefore accomplished by pushing the wire 5 inwardly of the shell 7 to a position shown in the right hand portion of Figure 2, in which position there is no wedging action, since the forward edges of the jaw members are not wedged by the tapered surface of the shell to a biting or securing position with respect to the wire. Thus, the chuck is pushed rearwardly into the shell to an extent sufficient so that the forward edge thereof is disposed rearwardly of the opening 20. The tool or stud member 21 is then inserted into the opening, in the manner shown in Figure 2, and, since the jaw members 11 are in released position with respect to the wire 5, the wire can then be released, since forward movement of the chuck is prevented by the obstruction of the tool 21.

After the wire has thus been withdrawn from the splice, the tool 21 is withdrawn from the opening 20, and the spring 17 forces the chuck into wire-receiving position covering the opening 20. It is only necessary, in the present invention, to make sure that the distance from the end of the shell 7 to the opening 20 is great enough so that the jaws may be held in released position for the largest wire which the splice will accommodate. This can be determined readily, and the splice shell can then be drilled accordingly.

It is apparent that the invention may be equally well applied to splices which are now in use, since it is an easy matter to drill the opening 20 in a splice which has been placed in position.

I do not intend to be limited to the exact method of forming the means for effecting release of the wire from the gripping chuck, since it is obvious that any other type of structure which will accomplish this result might be used with equal facility. I therefore intend to limit my invention only as defined by the scope and spirit of the appended claim.

I claim:

Wire splicing means for connecting wires comprising a casing formed from an integral piece of metal tubing, the end portions of said tubing being reduced in diameter to form tapering end portions, said casing having end openings for the insertion of wires into the casing, means housed entirely within the casing for holding the wires against outward movement comprising sets of wedge members located in and engaging the walls of each tapered end portion, means engaging each set of wedge members and providing for conjoint movement of the individual members comprising each of said sets, spring followers at the inner ends of each set of wedge members, a coil spring located between said spring followers for normally holding said sets of wedge members in spaced relation and in contact with the tapering walls of said end portions, said wedge members being initially moved inwardly and expanded into wire-receiving position upon insertion of a wire into the end opening of said casing, and means for effecting release of the wires from said wedge members comprising an opening formed in each of the tapered end portions of said casing intermediate the ends of said portions whereby a tool may be inserted therethrough into the interior of said end portions to prevent outward movement of the forward end of each set of wedge members from wire-receiving position upon movement of said wire outwardly of said casing, said openings normally being closed by the outer peripheral surfaces of said sets of wedge members.

O. EDWARD OHLUND.